US012683786B2

(12) United States Patent
Anthony Albero et al.

(10) Patent No.: US 12,683,786 B2
(45) Date of Patent: Jul. 14, 2026

(54) DYNAMIC AND INTELLIGENT TOKEN-BASED RESOURCE EVENT FACILITATION NETWORK

(71) Applicant: BANK OF AMERICA CORPORATION, Charlotte, NC (US)

(72) Inventors: George Anthony Albero, Charlotte, NC (US); Naga Vamsi Krishna Akkapeddi, Charlotte, NC (US); Elijah Clark, Charlotte, NC (US); Sanjay Arjun Lohar, Charlotte, NC (US); James J. Siekman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 141 days.

(21) Appl. No.: 18/606,505

(22) Filed: Mar. 15, 2024

(65) Prior Publication Data

US 2025/0293881 A1     Sep. 18, 2025

(51) Int. Cl.
*H04L 9/40* (2022.01)
*G06F 9/50* (2006.01)
*H04L 9/32* (2006.01)

(52) U.S. Cl.
CPC .......... *H04L 9/3213* (2013.01); *G06F 9/5072* (2013.01)

(58) Field of Classification Search
CPC ..... H04L 9/3213; H04L 63/12; G06F 9/5072; G06Q 20/405
See application file for complete search history.

(56) References Cited

U.S. PATENT DOCUMENTS

2020/0021537 A1* 1/2020 Oliveira ................. H04L 47/72
2023/0410195 A1* 12/2023 Schwartz ............... G06Q 40/03

FOREIGN PATENT DOCUMENTS

WO     WO-2024186954 A2 * 9/2024   ............. G06Q 50/26

* cited by examiner

*Primary Examiner* — Tan Doan
(74) *Attorney, Agent, or Firm* — Moore & Van Allen PLLC; Nicholas C. Russell

(57) ABSTRACT

A dynamic and intelligent token-based resource event facilitation network is disclosed that limits exposure of user data to resource providers virtually located within virtual computing networks. The invention implements a dynamic token generator that is configured to generate tokens that allow a user to negotiate the terms/parameters of a resource event, such as a resource advancement or the like. Each token stores only a distinct portion of the user's attribute data. Negotiation occurs through incremental communication/distribution of the tokens to the resource providers, such that only the minimal amount of user attribute data necessary for a resource provider to meet user-defined rules is communicated to perspective resource providers.

20 Claims, 3 Drawing Sheets

Figure 2:
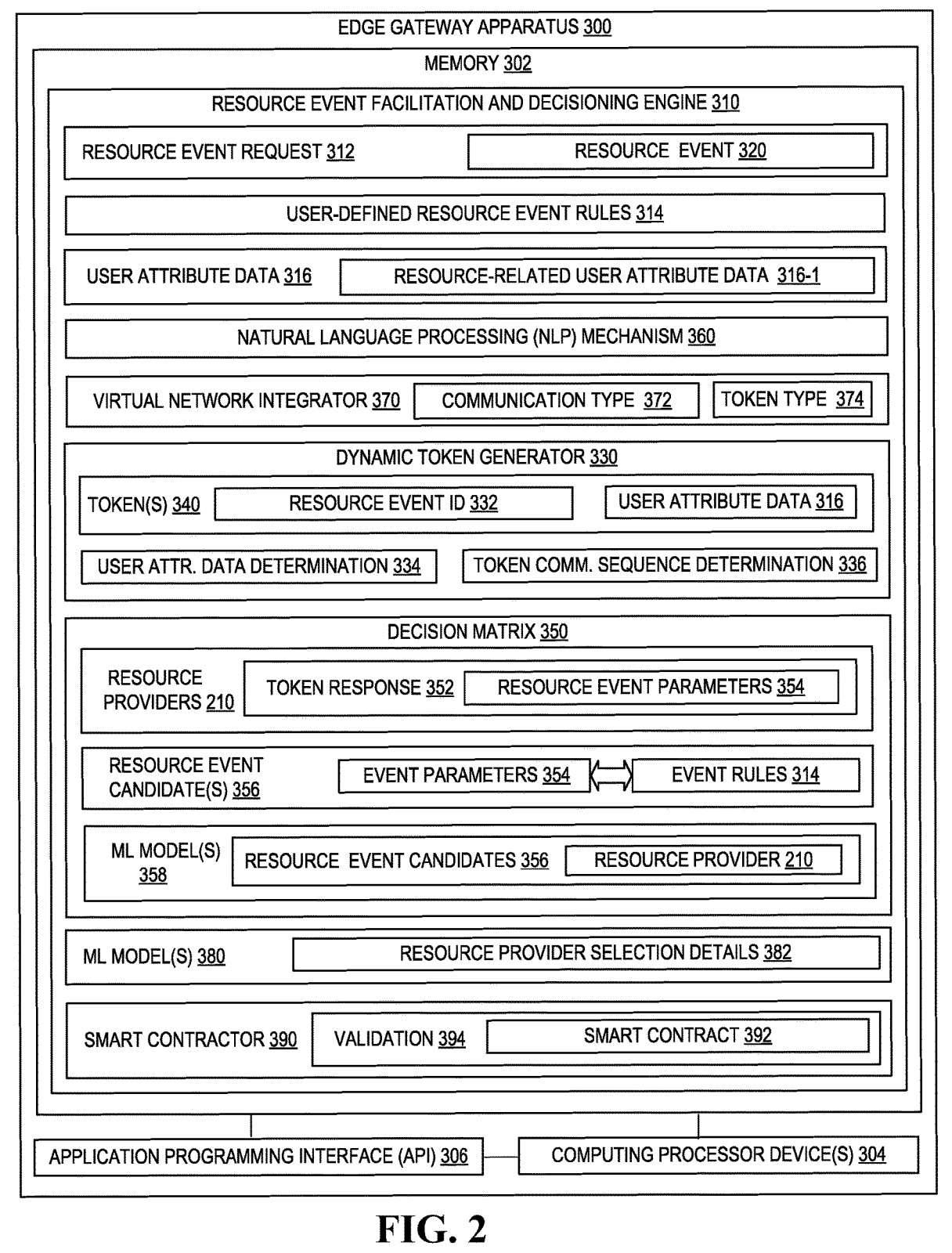

EDGE GATEWAY APPARATUS 300

MEMORY 302

RESOURCE EVENT FACILITATION AND DECISIONING ENGINE 310

RESOURCE EVENT REQUEST 312 | RESOURCE EVENT 320

USER-DEFINED RESOURCE EVENT RULES 314

USER ATTRIBUTE DATA 316 | RESOURCE-RELATED USER ATTRIBUTE DATA 316-1

NATURAL LANGUAGE PROCESSING (NLP) MECHANISM 360

VIRTUAL NETWORK INTEGRATOR 370 | COMMUNICATION TYPE 372 | TOKEN TYPE 374

DYNAMIC TOKEN GENERATOR 330

TOKEN(S) 340 | RESOURCE EVENT ID 332 | USER ATTRIBUTE DATA 316

USER ATTR. DATA DETERMINATION 334 | TOKEN COMM. SEQUENCE DETERMINATION 336

DECISION MATRIX 350

RESOURCE PROVIDERS 210 | TOKEN RESPONSE 352 | RESOURCE EVENT PARAMETERS 354

RESOURCE EVENT CANDIDATE(S) 356 | EVENT PARAMETERS 354 ⟷ EVENT RULES 314

ML MODEL(S) 358 | RESOURCE EVENT CANDIDATES 356 | RESOURCE PROVIDER 210

ML MODEL(S) 380 | RESOURCE PROVIDER SELECTION DETAILS 382

SMART CONTRACTOR 390 | VALIDATION 394 | SMART CONTRACT 392

APPLICATION PROGRAMMING INTERFACE (API) 306 | COMPUTING PROCESSOR DEVICE(S) 304

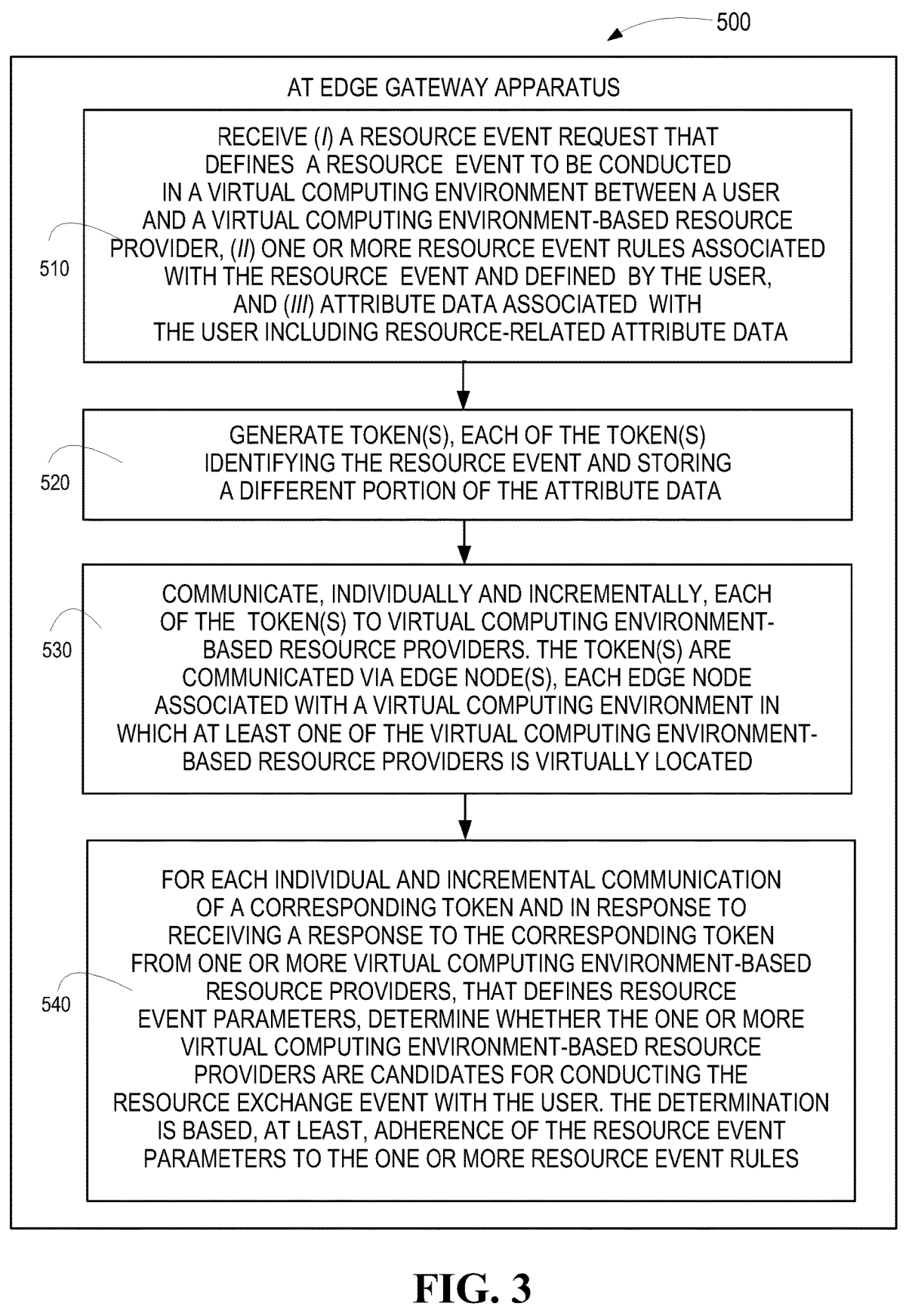

AT EDGE GATEWAY APPARATUS

510

RECEIVE (*I*) A RESOURCE EVENT REQUEST THAT
DEFINES A RESOURCE EVENT TO BE CONDUCTED
IN A VIRTUAL COMPUTING ENVIRONMENT BETWEEN A USER
AND A VIRTUAL COMPUTING ENVIRONMENT-BASED RESOURCE
PROVIDER, (*II*) ONE OR MORE RESOURCE EVENT RULES ASSOCIATED
WITH THE RESOURCE EVENT AND DEFINED BY THE USER,
AND (*III*) ATTRIBUTE DATA ASSOCIATED WITH
THE USER INCLUDING RESOURCE-RELATED ATTRIBUTE DATA

520

GENERATE TOKEN(S), EACH OF THE TOKEN(S)
IDENTIFYING THE RESOURCE EVENT AND STORING
A DIFFERENT PORTION OF THE ATTRIBUTE DATA

530

COMMUNICATE, INDIVIDUALLY AND INCREMENTALLY, EACH
OF THE TOKEN(S) TO VIRTUAL COMPUTING ENVIRONMENT-
BASED RESOURCE PROVIDERS. THE TOKEN(S) ARE
COMMUNICATED VIA EDGE NODE(S), EACH EDGE NODE
ASSOCIATED WITH A VIRTUAL COMPUTING ENVIRONMENT IN
WHICH AT LEAST ONE OF THE VIRTUAL COMPUTING ENVIRONMENT-
BASED RESOURCE PROVIDERS IS VIRTUALLY LOCATED

540

FOR EACH INDIVIDUAL AND INCREMENTAL COMMUNICATION
OF A CORRESPONDING TOKEN AND IN RESPONSE TO
RECEIVING A RESPONSE TO THE CORRESPONDING TOKEN
FROM ONE OR MORE VIRTUAL COMPUTING ENVIRONMENT-BASED
RESOURCE PROVIDERS, THAT DEFINES RESOURCE
EVENT PARAMETERS, DETERMINE WHETHER THE ONE OR MORE
VIRTUAL COMPUTING ENVIRONMENT-BASED RESOURCE
PROVIDERS ARE CANDIDATES FOR CONDUCTING THE
RESOURCE EXCHANGE EVENT WITH THE USER. THE DETERMINATION
IS BASED, AT LEAST, ADHERENCE OF THE RESOURCE EVENT
PARAMETERS TO THE ONE OR MORE RESOURCE EVENT RULES

FIG. 3

DYNAMIC AND INTELLIGENT TOKEN-BASED RESOURCE EVENT FACILITATION NETWORK

FIELD OF THE INVENTION

The present invention is generally directed to data security and, more specifically, implementing a dynamic and intelligent token-based resource event facilitation network for purposes of limiting exposure of user data.

BACKGROUND

The use of augmented and/or virtual reality computing systems (collectively referred to herein as "virtual computing systems" or "virtual computing networks") have become increasing more prevalent. By way of example, metaverse is a hypothetical iteration of the Internet as a single, universal and immersive virtual computing systems (including multiple different VR computing systems) that is facilitated by the use of virtual reality and augmented reality headsets. Thus, Metaverse and other similar emerging virtual computing networks provide the ability for a user to associate with an avatar (i.e., a virtual representation/object of the user) and for the avatar to conduct resource events within a virtual environment. While the resource event is initiated entirely within the virtual environment, it results in an actual exchange of resources between the user and the resource-providing entity.

In certain instances, the resource events that are conducted within the realm of a virtual computing network require users to submit information in order for the resource event to be approved or otherwise locate a resource provider willing to participate in the resource event. For example, a user may be applying for a resource advancement with desired parameters and each perspective virtual computing network-based resource provider may require different information in order for the desired parameters to be met. The information may be user attribute data, such as, a user's personal data, as well as the user's resource-related information. As data breaches become more prevalent and alarming, from the user's perspective the less user attribute data that is disseminated and stored/maintained by resource providers the better.

Therefore, a need exists to develop systems, methods, computer program products and that allow for resource events to be conducted within virtual computing networks, such as the Metaverse or the like, while maintaining data security. In this regard, a need exist to limit the degree to which a user's attribute data, such as personal data and/or resource-related data is disseminated during resource event facilitation and/or decisioning. Specifically, in instances in which a user desires to acquire a resource advancement or the like and is attempting to locate a virtual computing network-based resource provider that meets the user's parameters/rules, a need exists to ensure that such resource providers can be located within the virtual computing network, while limiting the amount and or type of user attribute data that is distributed to the resource providers.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a dynamic and intelligent token-based resource event facilitation network for purposes of limiting exposure of user data to resource providers virtually located within virtual computing networks. In this regard, the present invention implements a resource event facilitation and decisioning engine disposed with an edge gateway apparatus. The engine includes a dynamic token generator that is configured to generate tokens that allow a user to negotiate the terms/parameters of a resource event, such as a resource advancement or the like, while limiting data exposure. Specifically, the present invention creates a series of tokens with each token storing only a portion of the user's available attribute data and each token is communicated to perspective virtual computing network-based resource providers individually and incrementally. Once a token has been distributed amongst the resource providers and responses are received that define the resource provider's parameters/terms for the resource event, a decision matrix is implemented to determine if the resource provider's parameters/terms meet user-defined resource event rules. If one or more of resource providers parameters/terms are determined to meet the user-defined resource event rules, the resource provider(s) become candidates for conducting the resource event and no further tokens (i.e., no additional user attribute data) need to be communicated to the candidate resource provider(s) (i.e., no additional user data needs to be exposed to the resource providers). However, in the event that none of resource provider's parameters/terms are determined to meet the user-defined resource event rules, a further token is communicated to the perspective resource providers that includes an additional portion of the user's attribute data, e.g., additional resource-related data or the like. Further tokens may be communicated until at least one of the perspective virtual computing network-based resource providers is determined to be candidate for conducting the resource event (i.e., at least one perspective resource provider provides parameters/terms that meet the user-defined resource event rules).

Additionally, the token generator may also be configured to determine which portion of the overall user attribute data to store in each token. In such embodiments, the determination as to which portion of the user attribute data to store in the token may be based on last-in-time responses received (i.e., resource provider parameters/terms) and/or results of the decision matrix (e.g., how close/far away the resource provider parameters/terms are to meeting the user-defined rules). In related embodiments of the invention, in which all of the tokens are generated at the onset (i.e., before any tokens are communicated to the resource providers) the token generator may also be configured to determine the sequence/order in which the tokens are communicated.

In addition, the decision matrix may be configured to select one of the candidates as the resource provider for the resource event. In related specific embodiments of the invention, Machine Learning (ML) models are employed to assist in the selection of the resource provider and/or provide details of the selection process (i.e., why and how the resource provider was selected for the resource event).

Moreover, the resource event facilitation and decisioning engine may implement a Natural Language Processing (NLP) engine, which allows the user to provide inputs, such as resource event rules, attribute data or the like in any form (e.g., audio/voice, visual/sign language, text or the like) from any device and/or platform (e.g., within a virtual computing network, an application or the like).

Additionally, the resource event facilitation and decisioning engine may include an integrator function that is configured to determine communication mechanisms (e.g., API, cellular network (e.g., 5G), event streaming or the like) for the various different virtual communication networks at which the perspective resource providers are virtually located, as well as the type of token (SAND, MANA, WILD or the like) that the various different virtual computing networks are configured to accept.

In addition, the resource event facilitation and decisioning engine may include a smart contractor which, upon selection of a resource provider, is configured to generate and, in some instances, validate a smart contract that consummates the resource event. Validation may include, but is not limited to, ensuring that the user-defined rules are adhered to, making certain that the contract contains no non-enforceable clauses, such as intentionally deceptive clauses or additional clauses that are contrary to the user.

A system for facilitating a resource event defines first embodiments of the invention. The system includes an edge gateway apparatus having a memory, and one or more processor devices in communication with the memory. The memory stores a resource event facilitation and decisioning engine that is executable by the one or more processor devices. The resource event facilitation and decisioning engine is configured to receive (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data.

The resource event facilitation and decisioning engine includes a dynamic token generator configured to (i) generate one or more tokens, each of the one or more tokens identifying the resource event and storing a different portion of the attribute data, and (ii) communicate, individually and incrementally, each of the one or more tokens to a plurality of virtual computing environment-based resource providers. The one or more tokens are communicated via one or more edge nodes, each edge node associated with a virtual computing environment in which at least one of a plurality of virtual computing environment-based resource providers is virtually located.

The resource event facilitation and decisioning engine includes a decision matrix configured to, for each individual and incremental communication of a corresponding token from amongst the one or more tokens and in response to receiving a response to the corresponding token from one or more of the plurality of virtual computing environment-based resource providers, that defines resource event parameters, determine whether the one or more of the plurality of virtual computing environment-based resource providers are candidates for conducting the resource event with the user. The candidate determination is based, at least, adherence of the resource event parameters to the one or more resource event rules.

In specific embodiments of the system, the resource event facilitation and decisioning engine further includes an integrator configured to determine (i) a communication mechanism for communicating with each of the one or more edge nodes, and (ii) a token type associated with each of the one or more edge nodes.

In further specific embodiments of the system, the dynamic token generator is further configured to determine which different portion of the attribute data to store in each of the one or more tokens. In specific related embodiments of the system, determining which different portion further includes dynamically determining which portion of the attribute data to store in a next-in-time communicated token based at least on the resource event parameters in responses to a last-in-time token received from the one or more of the plurality of virtual computing environment-based resource providers.

In still further specific embodiments of the system, the dynamic token generator is further configured to determine a sequence for communicating, individually and incrementally, each of the one or more tokens to the plurality of virtual computing environment-based resource providers. The determination of the sequence is based, at least, on the portion of the attribute data stored in each of the one or more tokens.

In other specific embodiments of the system, the decision matrix is further configured to select, from amongst one or more virtual computing environment-based resource providers determined to be candidates, the virtual computing environment-based resource provider for conducting the resource event. In related embodiments of the system, the decision matrix includes one or more machine learning (ML) models configured to assist in the selection of the virtual computing environment-based resource provider for conducting the resource event and/or provide selection details that indicate how and why the virtual computing environment-based resource provider was selected for conducting the resource event.

In additional specific embodiments of the system, the resource event facilitation and decisioning engine further includes a smart contractor configured to generate a smart contract based at least on the resource event parameters of the selected virtual computing environment-based resource provider and the one or more resource event rules associated with the resource event. In related embodiments of the system, the smart contractor is configured to validate the smart contract. Validating the smart contract includes at least one of verifying that the smart contract (i) complies to the one or more resource event rules, (ii) does not include non-enforceable clauses, such as intentionally deceptive clauses, and (iii) does not include additional rules in addition to the one or more resource event rules or otherwise provide the resource provider with additional resource control.

A computer-implemented method for facilitating a resource event defines second embodiments of the invention. The computer-implemented method is executable by one or more computing processor devices. Th method includes receiving, at an edge gateway, (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data. In addition, the method includes (a) generating, at the edge gateway, one or more tokens, each of the one or more tokens identifying the resource event and storing a different portion of the attribute data, and (b) communicating, from the edge gateway, individually and incrementally, each of the one or more tokens to a plurality of virtual computing environment-based resource providers. The one or more tokens are communicated via one or more edge nodes, each edge node associated with a virtual computing environment in which at least one of a plurality of virtual computing environment-based resource providers is virtually located. Moreover, the method includes, for each individual and incremental communication of a corresponding token from amongst the one or more tokens and in response to receiving a response to the corresponding token from one or more of the plurality of virtual computing environment-based resource providers, that defines resource event parameters, determining, at the edge gateway, whether the one or more of the plurality of virtual computing environment-based resource providers are candidates for conducting the resource event with the user. The determination is based, at least, adherence of the resource event parameters to the one or more resource event rules.

In specific embodiments the computer-implemented method further includes determining, at the edge gateway, (i) a communication mechanism for communicating with each of the one or more edge nodes, and (ii) a token type associated with each of the one or more edge nodes, The one or more tokens are generated in the determined token type.

In other specific embodiments the computer-implemented method further includes determining which different portion of the attribute data to store in a next-in-time communicated token based at least on the resource event parameters in responses to a last-in-time token received from the one or more of the plurality of virtual computing environment-based resource providers. In related specific embodiments the computer-implemented method further includes determining a sequence for communicating, individually and incrementally, each of the one or more tokens to the plurality of virtual computing environment-based resource providers. The determination of the sequence is based, at least, on the portion of the attribute data stored in each of the one or more tokens.

In further specific embodiments the computer-implemented method further includes selecting, from amongst one or more virtual computing environment-based resource providers determined to be candidates, the virtual computing environment-based resource provider for conducting the resource event. In related embodiments the computer-implemented method further includes implementing one or more machine learning (ML) models configured to provide selection details that indicate how and why the virtual computing environment-based resource provider was selected for conducting the resource event. In further related embodiments the computer-implemented method further includes generating a smart contract based at least on the resource event parameters of the selected virtual computing environment-based resource provider and the one or more resource event rules associated with the resource event and validating the smart contract. Validating the smart contract includes at least one of verifying that the smart contract (i) complies to the one or more resource event rules, (ii) does not include non-enforceable clauses, such as intentionally deceptive clauses, and (iii) does not include additional rules in addition to the one or more resource event rules.

A computer program product including a non-transitory computer-readable medium defines third embodiments of the invention. The non-transitory computer-readable medium includes a first set of codes for causing an edge gateway computing device to receive (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data. The computer-readable medium additionally includes a second set of codes for causing the edge gateway apparatus to generate one or more tokens, each of the one or more tokens identifying the resource event and storing a different portion of the attribute data and a third set of codes for causing the edge gateway apparatus to communicate, individually and incrementally, each of the one or more tokens to a plurality of virtual computing environment-based resource providers. The one or more tokens are communicated via one or more edge nodes, each edge node associated with a virtual computing environment in which at least one of a plurality of virtual computing environment-based resource providers is virtually located. Moreover, the computer-readable medium includes a fourth set of codes for causing the edge gateway apparatus to, for each individual and incremental communication of a corresponding token from amongst the one or more tokens and in response to receiving a response to the corresponding token from one or more of the plurality of virtual computing environment-based resource providers, that defines resource event parameters, determine, at the edge gateway, whether the one or more of the plurality of virtual computing environment-based resource providers are candidates for conducting the resource event with the user. The determination is based, at least, adherence of the resource event parameters to the one or more resource event rules.

In specific embodiments of the computer program product, the computer-readable medium further includes a fifth set of codes for causing the edge gateway apparatus to determine (i) a communication mechanism for communicating with each of the one or more edge nodes, and (ii) a token type associated with each of the one or more edge nodes. The one or more tokens are generated in the determined token type.

In further specific embodiments of the computer program product, the computer-readable medium includes a fifth set of codes for causing the edge gateway apparatus to select, from amongst one or more virtual computing environment-based resource providers determined to be candidates, the virtual computing environment-based resource provider for conducting the resource event. In related embodiments of the computer program product, the computer-readable medium includes a sixth set of codes for causing the edge gateway apparatus to implement one or more machine learning (ML) models configured to provide selection details that indicate how and why the virtual computing environment-based resource provider was selected for conducting the resource event.

Thus, according to embodiments of the invention, which will be discussed in greater detail below, the present invention addresses needs and/or achieves other advantages by providing for a dynamic and intelligent token-based resource event facilitation network for purposes of limiting exposure of user data to resource providers virtually located within virtual computing networks. The invention implements a dynamic token generator that is configured to generate tokens that allow a user to negotiate the terms/parameters of a resource event, such as a resource advancement or the like, while limiting data exposure. Specifically, a series of tokens is created with each token storing only a portion of the user's available attribute data and each token is communicated to perspective virtual computing network-based resource providers individually and incrementally. Once a token has been distributed amongst the resource providers and responses received from the resource providers including resource event parameters/terms, a decision matrix determines whether the resource event parameters/terms meet the user-defined resource event rules. Further tokens are generated and/or communicated to the resource provider based on whether resource providers meet the user-defined resource event rules.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
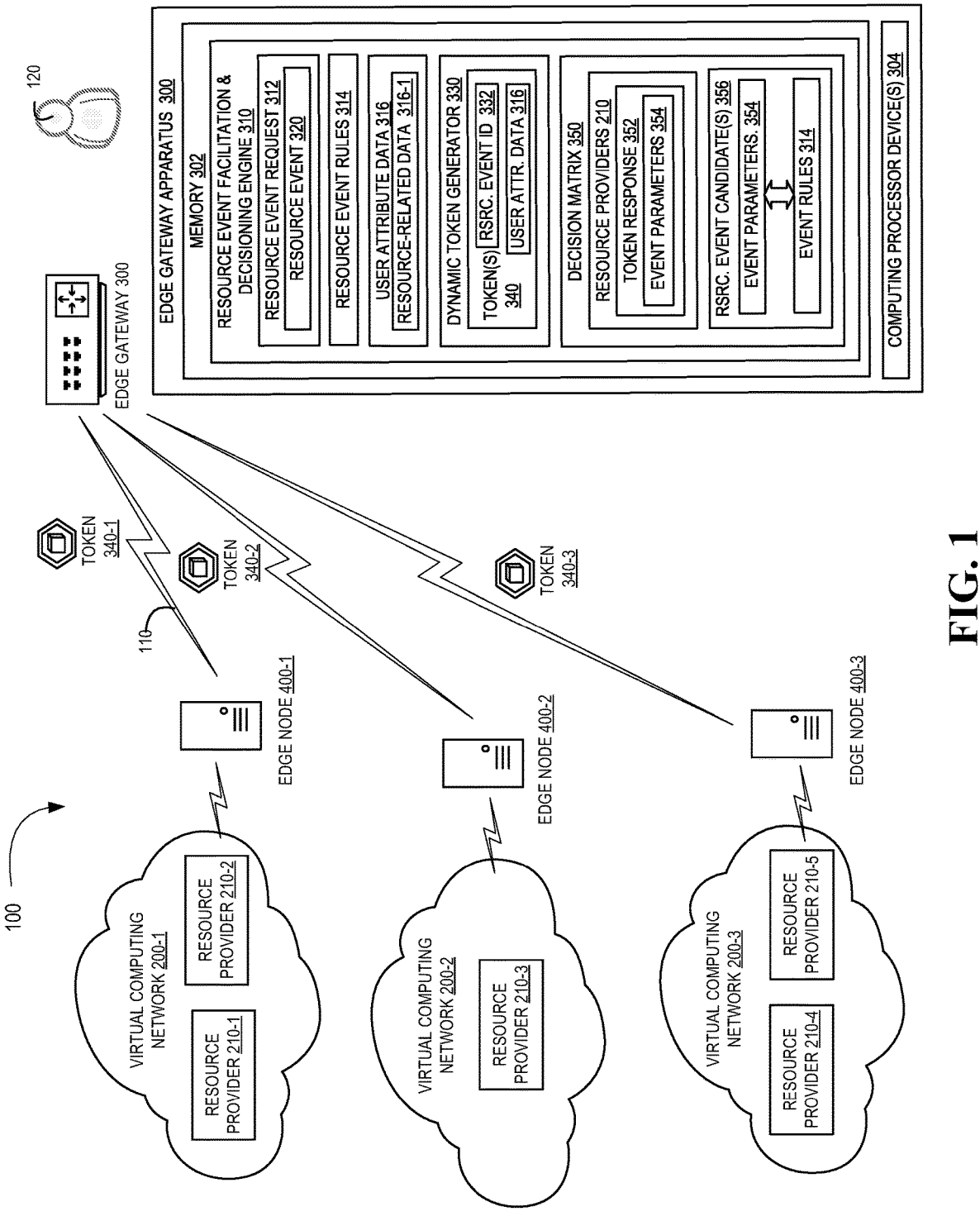

Having thus described embodiments of the disclosure in general terms, reference will now be made to the accompanying drawings, wherein:

FIG. 1 is a schematic/block diagram of a system for dynamic and intelligent token-based facilitation of resource events within virtual computing networks, in accordance with embodiments of the present invention;

FIG. 2 is a schematic/block diagram of an edge gateway apparatus including a resource event facilitation and decisioning engine, in accordance with alternate embodiments of the present invention; and FIG. 3 is a flow diagram of a method for facilitation of a resource event, in accordance with alternate embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Resources" as used herein refers to any property or commodity, including but not limited to financial resources, such as, but not limited to, cash, cryptocurrency, savings, credit, investments, real property, or any other form of earnings. "Resource event" as used herein refers to a resource transaction, such, but not limited to, a loan or other credit distribution event (e.g., credit card or the like), purchase transaction or the like.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a dynamic and intelligent token-based resource event facilitation network for purposes of limiting exposure of user data to resource providers virtually located within virtual computing networks. In this regard, the present invention implements a resource event facilitation and decisioning engine disposed with an edge gateway apparatus. The engine includes a dynamic token generator that is configured to generate tokens that allow a user to negotiate the terms/parameters of a resource event, such as a resource advancement or the like, while limiting data exposure. Specifically, the present invention creates a series of tokens with each token storing only a portion of the user's available attribute data and each token is communicated to perspective virtual computing network-based resource providers individually and incrementally. Once a token has been distributed amongst the resource providers and responses are received that define the resource provider's parameters/terms for the resource event, a decision matrix is implemented to determine if the resource provider's parameters/terms meet user-defined resource event rules. If one or more of resource providers parameters/terms are determined to meet the user-defined resource event rules, the resource provider(s) become candidates for conducting the resource event and no further tokens (i.e., no additional user attribute data) need to be communicated to the candidate resource provider(s) (i.e., no additional user data needs to be exposed to the resource providers). However, in the event that none of resource provider's parameters/terms are determined to meet the user-defined resource event rules, a further token is communicated to the perspective resource providers that includes an additional portion of the user's attribute data, e.g., additional resource-related data or the like. Further tokens may be communicated until at least one of the perspective virtual computing network-based resource providers is determined to be candidate for conducting the resource event (i.e., at least one perspective resource provider provides parameters/terms that meet the user-defined resource event rules).

In specific embodiments of the invention, the token generator is configured to determine which portion of the overall user attribute data to store in each token. In such embodiments, the determination as to which portion of the user attribute data to store in the token may be based on last-in-time responses received (i.e., resource provider parameters/terms) and/or results of the decision matrix (e.g., how close/far away the resource provider parameters/terms are to meeting the user-defined rules). In related embodiments of the invention, in which all of the tokens are generated at the onset (i.e., before any tokens are communicated to the resource providers) the token generator may also be configured to determine the sequence/order in which the tokens are communicated.

In additional specific embodiments of the invention, the decision matrix is configured to select one of the candidates as the resource provider for the resource event. In related specific embodiments of the invention, Machine Learning (ML) models are employed to assist in the selection of the resource provider and/or provide details of the selection process (i.e., why and how the resource provider was selected for the resource event).

Moreover, in additional specific embodiments of the invention, the resource event facilitation and decisioning engine implements a Natural Language Processing (NLP) engine, which allows the user to provide inputs, such as resource event rules, attribute data or the like in any form (e.g., audio/voice, visual/sign language, text or the like) from any device and/or platform (e.g., within a virtual computing network, an application or the like).

In further specific embodiments of the invention, the resource event facilitation and decisioning engine includes an integrator function that is configured to determine communication mechanisms (e.g., API, cellular network (e.g., 5G), event streaming or the like) for the various different virtual communication networks at which the perspective resource providers are virtually located, as well as the type of token (SAND, MANA, WILD or the like) that the various different virtual computing networks are configured to accept.

In additional embodiments of the invention, the resource event facilitation and decisioning engine includes a smart contractor which, upon selection of a resource provider, is configured to generate and, in some instances, validate a smart contract that consummates the resource event. Validation may include, but is not limited to, ensuring that the user-defined rules are adhered to, making certain that the contract contains no non-enforceable clauses, such as intentionally deceptive clauses or additional clauses that are contrary to the user.

Referring to FIG. 1, a schematic/block diagram is presented of an exemplary system 100 for facilitating resource events, in accordance with embodiments of the present invention. The system 100 is implemented across a distributed communication network 110, which may include the Intranet, one or more intranets, one or more cellular networks or the like. As depicted, the system 100 includes an edge gateway apparatus 300 that is disposed at the edge of one or more virtual computing networks 200. Virtual computing network 200 as used herein includes any network that implements virtual reality and/or augmented reality, such as Metaverse or the like. Edge gateway apparatus 300 includes a memory 302 and one or more computing processor devices in communication with memory 302. Memory 302 stores resource event facilitation and decisioning engine 310 that is executable by at least one of the computing processor device(s) 304.

Resource event facilitation and decisioning engine 310 is configured to receive a resource event request 312 from user 120 that defines a resource event 320 to be conducted in virtual computing network 200 between the user 120 and a virtual computing network-based resource provider 210. Further, resource event facilitation and decisioning engine 310 is configured to receive resource event rules 314 that are associated with the resource event 320 and defined by the user 120. The resource event rules 314 are requirements that must be adhered to/satisfied in order for the resource event to formed and processed. Moreover, resource event facilitation and decisioning engine 310 is configured to receive user attribute data 316 including, but not limited to, resource-related attribute data 316-1. User attribute data 316 may include personal data of the user (e.g., name, address, social security number and the like). Resource-related data 316-1 may include any data associated with resources held by the user, resources owed by the user and the like. User attribute data 316 may be received from the user, the user's computing device and/or a third-party in control of such data, such as a resource holder or the like.

Resource event facilitation and decisioning engine 310 includes dynamic token generator 330 that is configured to generate one and, typically, a series of tokens 340, each of the token(s) include a resource event identifier 332 and store a different portion of the user attribute data 316. For example, a first token 340 may store one specific resource-related attribute datum 316-1 (e.g., resources received from employment) and a second token may store another specific resource-related attribute datum 316-1 (e.g., investment resources) and so on. The dynamic token generator 330 is further configured to individually and incrementally communicate the tokens to a plurality of virtual computing environment-based resource providers 210. The tokens 340 are communicated to the resource providers 210 via edge nodes 400. The resource providers 210 may be virtually located in one or more virtual computing networks 200. For example, as shown in FIG. 1, token 340-1 (which may of a different token type but stores the same user attribute data as tokens 340-2 and 340-2) is communicated to edge node 400-1, which is in communication with virtual computing network 200-1 and provides subsequent communication of token 340-1 to resource providers 210-1 and 210-2. Token 340-2 is communicated to edge node 400-2, which is in communication with virtual computing network 200-2 and provides subsequent communication of token 340-2 to resource provider 210. Further, token 340-3 is communicated to edge node 400-3, which is in communication with virtual computing network 200-3 and provides subsequent communication of token 340-3 to resource providers 210-4 and 210-5. Incremental communication means that one specific token and is communicated to the resource providers 210 and token responses 352 are received by the engine 310 before a subsequent token is communicated.

Resource event facilitation and decisioning engine 310 further includes decision matrix 350 that is configured to, (i) for each individual and incremental communication of a corresponding token 340 and (ii) in response to receiving a token response 352 that includes resource event parameters 354 (otherwise referred to as "terms") from one or more of the service providers 210-1-210-5, determine whether the resource providers 210 that provided token responses are resource event candidates 356 for conducting the resource event 320 with the user 120. The determination on whether a resource provider 210 is a resource event candidate 356 is based, at least, on adherence of the resource event parameters 354 to the user-defined resource event rules 314. In this regard, in specific embodiments of the system, if the resource event parameters 354 adhere or otherwise satisfy the user-defined resource event rules 314 the resource provider is deemed to be a resource event candidate 356.

Referring to FIG. 2, a block diagram is depicted of edge gateway apparatus 300 including resource event facilitation and decisioning engine 310, in accordance with embodiments of the present invention. In addition to providing greater detail, FIG. 3 highlights various alternate embodiments of the resource event facilitation and decisioning engine 310. Edge gateway apparatus 300 comprises one or more computing devices configured to execute software programs, including instructions, engines, algorithms, modules, routines, applications, tools, and the like. As previously discussed, edge gateway apparatus 300 includes memory 302, which may comprise volatile and non-volatile memory, such as read-only memory (ROM) and/or random-access memory (RAM), EPROM, EEPROM, flash cards, or any memory common to computer platforms. Moreover, memory 302 may comprise cloud storage, such as provided by a cloud storage service and/or a cloud connection service.

Further, edge gateway apparatus 300 also includes computing processor device(s) 304, which may be an application-specific integrated circuit ("ASIC"), or other chipset, logic circuit, or other data processor device. Processor device 304 may execute an application programming interface ("API") 306 that interfaces with any resident programs, such as resource event facilitation and decisioning engine 310 and algorithms, sub-engines/routines associated therewith or the like stored in the memory 302 of the edge gateway apparatus 300.

Processor device(s) 304 may include various processing subsystems (not shown in FIG. 2) embodied in hardware, firmware, software, and combinations thereof, that enable the functionality of edge gateway apparatus 300 and the operability of edge gateway apparatus 300 on a distributed communication network 110 (shown in FIG. 1). For example, processing subsystems allow for initiating and maintaining communications and exchanging data with other networked devices, such as edge nodes 400 (shown in FIG. 1). For the disclosed embodiments of the invention, processing subsystems of computing processor device 304 may include any subsystem used in conjunction with resource event facilitation and decisioning engine 310 and related engines, routines, algorithms, sub-algorithms, modules, sub-modules thereof.

Edge gateway apparatus 300 additionally includes a communications module (not shown in FIG. 2) embodied in hardware, firmware, software, and combinations thereof, that enables electronic communications between edge gateway apparatus 300 and other networks and/or networked devices, such as, edge nodes 400 and the like. Thus, the communication module may include the requisite hardware, firmware, software and/or combinations thereof for establishing and maintaining a network communication connection with one or more systems, platforms, networks, or the like.

As previously discussed in relation to FIG. 1, memory 302 of edge gateway apparatus 300 stores resource event facilitation and decisioning engine 310 that are executable by the computing processor device(s) 304. Resource event facilitation and decisioning engine 310 is configured to receive a resource event request 312 from user 120 that defines a resource event 320 to be conducted in virtual computing network 200 between the user 120 and a virtual computing network-based resource provider 210. For example, in specific embodiments of the invention the resource event 320 is a resource advancement (e.g., credit, loan or the like). Further, resource event facilitation and decisioning engine 310 is configured to receive resource event rules 314 that are associated with the resource event 320 and defined by the user 120. The resource event rules 314 are requirements that must be adhered to/satisfied in order for the resource event to formed and processed. For example, in those embodiments of the invention in which the resource event 320 is a resource advancement the resource event rules 314 may stipulate the loan rate and/or duration of the loan or the like. Moreover, resource event facilitation and decisioning engine 310 is configured to receive user attribute data 316 including, but not limited to, resource-related attribute data 316-1. User attribute data 316 may include personal data of the user (e.g., name, address, characteristic data (e.g., fingerprint, facial image, or the like), social security number and the like). Resource-related data 316-1 may include any data associated with resources held by the user, resources owed by the user and the like. For example, in specific embodiments of the invention, resource-related user attribute data may include outstanding loans, real property, possessions (monetary and non-monetary), revenue data, such as salary, resource advancement indicator, family revenue, foreign possessions (monetary and non-monetary) and the like. User attribute data 316 may be received from the user, the user's computing device and/or a third-party in control of such data, such as a resource holder (e.g., financial institution(s)) or the like.

In specific embodiments of the invention, resource event facilitation and decisioning engine 310 includes natural language processing sub-engine mechanism 360 that is configured to understand, interpret, and generate human language in a way that is meaningful and useful for various applications, such as resource event facilitation and decisioning engine 310. In this regard, user inputs including resource event requests 312, resource event rules 314 and user attribute data 316 can be received in any form (e.g., text, audio/voice, visual/video sign language, and the like) from various different platforms (e.g., virtual reality platform, application platform or the like) and from any computing device configured to receive user inputs (e.g., mobile communication device/smart phone, laptop, PC, virtual reality (VR) headset and the like).

In other specific embodiments of the invention, resource event facilitation and decisioning engine 310 includes edge node/virtual network integrator 370 that is configured to determine, based on existing connection knowledge, a communication type 372 (e.g., API, cellular (e.g., 5G or the like), streaming events or the like for each edge node 400 and apply the communication when communicated with the edge node 400. In addition, integrator 370 is configured to determine a token type 374 (e.g., SAND (i.e., Sandbox), MANA, WILD or the like) acceptable to the virtual computing network 200.

As previously discussed in relation to FIG. 1, resource event facilitation and decisioning engine 310 includes dynamic token generator 330 that is configured to generate one and, typically, a series of tokens 340, each of the token(s) include a resource event identifier 332 and store a different portion of the user attribute data 316. For example, a first token 340 may store one specific resource-related attribute datum 316-1 (e.g., user salary/revenue) and a second token may store another specific resource-related attribute datum 316-1 (e.g., stock/commodity investment holdings) and so on. It should be noted that each token 340 is not limited to one specific user attribute datum and may include multiple different user attribute datums (e.g., one token 340 may store all remaining user attribute datums). The dynamic token generator 330 is further configured to individually and incrementally communicate the tokens to a plurality of virtual computing environment-based resource providers 210. The tokens 340 are communicated to the resource providers 210 via edge nodes 400. The resource providers 210 may be virtually located in one or more virtual computing networks 200. Incremental communication means that one specific token and is communicated to the resource providers 210 and token responses 352 are received by the engine 310 before a subsequent token is communicated.

In specific embodiments of the invention, all of the individual tokens are generated prior to communication of any of the tokens 340. In such embodiments of the invention, dynamic token generator may include intelligence (e.g., algorithms, which may include AI/ML algorithms/model) for user attribute determination 334 (i.e., determining which user attribute datum 316 should be stored in which tokens 340) and intelligence (e.g., algorithms, which may include AI/ML algorithms/model) for token communication sequence determination 336 (i.e., the order in which the tokens are communicated). In such embodiments of the invention, the sequence determination 336 may be dynamically adjusted (i.e., order changed) based on the token responses 352 stemming from previously communicated tokens (e.g., whether candidates have been identified, how many candidates have been identified, closeness on resource event parameters to resource event rules 314 and the like). In other embodiments of the invention, tokens 340 may be generated dynamically in response to previously communicated tokens 340 and their corresponding token responses 352. In such embodiments of the invention, dynamic token generator may include intelligence (e.g., algorithms, which may include AI/ML algorithms/model) for user attribute determination 334 (i.e., determining which user attribute datum 316 should be stored in which tokens 340). In specific embodiments of the invention, the user attribute datum 316 for next-in-time communicated token 340 may be determined based token responses 352 from a last-in-time communicated token 340 (e.g., whether candidates have been identified, how many candidates have been identified, closeness on resource event parameters to resource event rules 314 and the like).

Resource event facilitation and decisioning engine 310 further includes decision matrix 350 that is configured to, (i) for each individual and incremental communication of a corresponding token 340 and (ii) in response to receiving a token response 352 that includes resource event parameters 354 (otherwise referred to as "terms") from one or more of the service providers 210-1-210-5, determine whether the resource providers 210 that provided token responses are resource event candidates 356 for conducting the resource event 320 with the user 120. The determination on whether a resource provider 210 is a resource event candidate 356 is based, at least, on adherence of the resource event parameters 354 to the user-defined resource event rules 314. For example, in those embodiments of the invention in which the resource event 320 is a resource advancement/loan the sole user-defined rule may stipulate that the user will only accept 5% Annual Percentage Rate (APR) or lower. If six token responses are received, three of which have APRs at or below 5% (and no other rules are defined by the user) the three resource suppliers (i.e., loan facilities) associated with these three token responses are deemed to be resource event candidates (i.e., candidates for providing the loan to the user). However, if none of the six token responses have APRs at or below 5%, further tokens with additional user attribute data will need to be communicated to the resource providers in an attempt to secure a loan with APR at or below 5%.

In specific embodiments of the invention, decision matrix 350 further includes logic, which may include ML models 358 for selecting a resource provider 210 to conduct the resource event (e.g., provide the loan or the like) from amongst a plurality of resource event candidates 356. In those embodiments of the invention, in which ML models 358 are implemented in the selection process, previous user data may be used by the models, such as previous user resource event history and the like. In related embodiments of the invention, resource event facilitation and decisioning engine 310 includes Machine Learning (ML models 380 that are to provide resource provider selection details 382 so that the user 120 is made aware of how and why the resource event candidate 356 was selected as the resource provider 200 to conduct the resource event and, in some embodiments, how and why other resource event candidate(s) 356 were not selected as the resource provider 210 to conduct the resource event.

In still further specific embodiments of the invention, resource event facilitation and decisioning engine 310 includes smart contractor 390 that is configured to generate a smart contract 392 between the user and selected resource provider 210 for the resource event 320. In additional embodiments of the invention, smart contractor 390 includes validation 394 mechanisms configured to verify at least one (i) the contract includes no non-enforceable clauses, including intentionally deceptive clauses, (ii) the contract adheres to the user-defined resource event rules, (iii) the contract includes no clauses that unknowingly give more control to the resource provider and the like.

Referring to FIG. 3, a flow diagram is depicted of a method 500 for resource event facilitation, in accordance with embodiments of the present invention. As previously discussed, the events herein discussed that comprise method 500 are conducted at an edge gateway apparatus, disposed at the edge of one or more virtual computing networks. At Event 510, (i) a resource event request that defines a resource event desired to be conducted in a virtual computing network between a user and a virtual computing network-based resource provider, (ii) one or more user-defined resource event rules, and (iii) attribute data associated with the user, including resource-related attribute data are received.

At Event 520, one or more (typically a series) token(s) are generated, each token identifying the resource event and storing a portion of the attribute data (i.e., not the entirety of the attribute data). For example, each token may store one or more individual attribute datum from the overall user attribute data. As previously discussed, the tokens may be generated at the onset, prior to communicating any tokens to the resource providers or the tokens may be generated dynamically in response to token responses and candidate determination (i.e., comparing resource event parameters in the token responses to the user-defined resource event rule).

At Event 510, each of the tokens are communicated, individually and incrementally to virtual computing network-based resource providers. The tokens are communicated to the resource providers via edge nodes, with each edge node associated with a corresponding virtual computing network in which at least one of the resource providers is virtually located. Incremental communication means that one specific token and is communicated to the resource providers and token responses are received and candidate assessments are made before a subsequent token is communicated.

For each individual and incremental communication of a corresponding token and, in response to receiving a response to the corresponding token that defines resource event parameters (e.g., terms) from one or more of the resource providers, at Event 540, a determination is made as to whether the responding resource providers are candidates for conducting the resource event. Such a determination is made, at least, based adherence/satisfaction of the resource event parameters to the user-defined resource event rules. In further embodiments of the invention, a selection of one of the candidates is made as the resource provider for conducting the resource event. The selection may be based on other factors, such as the user's historical resource event data or the like.

Thus, as described in detail above, present embodiments of the invention include systems, methods, computer program products and/or the like for a dynamic and intelligent token-based resource event facilitation network for purposes of limiting exposure of user data to resource providers virtually located within virtual computing networks. The invention implements a dynamic token generator that is configured to generate tokens that allow a user to negotiate the terms/parameters of a resource event, such as a resource advancement or the like, while limiting data exposure. Specifically, a series of tokens is created with each token storing only a portion of the user's available attribute data and each token is communicated to perspective virtual computing network-based resource providers individually and incrementally. Once a token has been distributed amongst the resource providers and responses received from the resource providers including resource event parameters/ terms, a decision matrix determines whether the resource event parameters/terms meet the user-defined resource event rules. Further tokens are generated and/or communicated to the resource provider based on whether resource providers meet the user-defined resource event rules.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for facilitating a resource event, the computer-implemented method is executable by one or more computing processor devices, the method comprising:

receiving, at an edge gateway, (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data;

generating, at the edge gateway, one or more tokens, each of the one or more tokens identifying the resource event and storing a different portion of the attribute data;

communicating, from the edge gateway, individually and incrementally, each of the one or more tokens to a plurality of virtual computing environment-based resource providers, wherein the one or more tokens are communicated via one or more edge nodes, each edge node associated with a virtual computing environment in which at least one of a plurality of virtual computing environment-based resource providers is virtually located;

for each individual and incremental communication of a corresponding token from amongst the one or more tokens and in response to receiving a response to the corresponding token from one or more of the plurality of virtual computing environment-based resource providers, that defines resource event parameters, determining, at the edge gateway, whether the one or more of the plurality of virtual computing environment-based resource providers are candidates for conducting the resource event with the user, wherein the determination is based, at least, adherence of the resource event parameters to the one or more resource event rules;

in response to determining that at least one of the one or more responding virtual computing environment-based resource providers is a candidate, refraining from communicating any additional tokens that store additional portions of the attribute data to the candidate virtual computing environment-based resource provider; and only in response to determining that none of the one or more responding virtual computing environment-based resource providers are candidates, communicating a next-in-time token from among the plurality of tokens, the next-in-time token storing an additional portion of the attribute data not stored in the previously communicated token, to at least one of the plurality of virtual computing environment-based resource providers.

2. The computer-implemented method of claim 1, further comprising:

determining, at the edge gateway, (i) a communication mechanism for communicating with each of the one or more edge nodes, and (ii) a token type associated with each of the one or more edge nodes, wherein the one or more tokens are generated in the determined token type.

3. The computer-implemented method of claim 1, further comprising at least one of:

determining which different portion of the attribute data to store in a next-in-time communicated token based at least on the resource event parameters in responses to a last-in-time token received from the one or more of the plurality of virtual computing environment-based resource providers; and determining a sequence for communicating, individually and incrementally, each of the one or more tokens to the plurality of virtual computing environment-based resource providers, wherein the determination of the sequence is based, at least, on the portion of the attribute data stored in each of the one or more tokens.

4. The computer-implemented method of claim 1, further comprising:

selecting, from amongst one or more virtual computing environment-based resource providers determined to be candidates, the virtual computing environment-based resource provider for conducting the resource event.

5. The computer-implemented method of claim 4, further comprising:

implementing one or more machine learning (ML) models configured to provide selection details that indicate how and why the virtual computing environment-based resource provider was selected for conducting the resource event.

6. The computer-implemented method of claim 4, further comprising:

generating a smart contract based at least on the resource event parameters of the selected virtual computing environment-based resource provider and the one or more resource event rules associated with the resource event; and validating the smart contract, wherein validating the smart contract includes at least one of verifying that the smart contract (i) complies to the one or more resource event rules, (ii) does not include non-enforceable clauses, and (iii) does not include additional rules in addition to the one or more resource event rules.

7. A system for facilitating a resource event, the system comprising:

an edge gateway apparatus including a memory, and one or more processor devices in communication with the memory, wherein the memory stores a resource event facilitation and decisioning engine:

(a) executable by the one or more processor devices, (b) configured to receive (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data, and (c) including:

a dynamic token generator configured to (i) generate one or more tokens, each of the one or more tokens identifying the resource event and storing a different portion of the attribute data, and (ii) communicate, individually and incrementally, each of the one or more tokens to a plurality of virtual computing environment-based resource providers, wherein the one or more tokens are communicated via one or more edge nodes, each edge node associated with a virtual computing environment in which at least one of a plurality of virtual computing environment-based resource providers is virtually located; and a decision matrix configured to, for each individual and incremental communication of a corresponding token from amongst the one or more tokens and in response to receiving a response to the corresponding token from one or more of the plurality of virtual computing environment-based resource providers, that defines resource event parameters, determine whether the one or more of the plurality of virtual computing environment-based resource providers are candidates for conducting the resource event with the user, wherein the determination is based, at least, adherence of the resource event parameters to the one or more resource event rules, wherein:

(i) in response to determining that at least one of the one or more responding virtual computing environment-based resource providers is a candidate, the resource event facilitation and decisioning engine refrains from communicating any additional tokens that store additional portions of the attribute data to the candidate virtual computing environment-based resource provider; and (ii) only in response to determining that none of the one or more responding virtual computing environment-based resource providers are candidates, the dynamic token generator communicates a next-in-time token from among the plurality of tokens, the next-in-time token storing an additional portion of the attribute data not stored in the previously communicated token, to at least one of the plurality of virtual computing environment-based resource providers.

8. The system of claim 7, wherein the resource event facilitation and decisioning engine further includes:

an integrator configured to determine (i) a communication mechanism for the edge gateway apparatus to communicate with each of the one or more edge nodes, and (ii) a token type associated with each of the one or more edge nodes.

9. The system of claim 7, wherein the dynamic token generator is further configured to determine which different portion of the attribute data to store in each of the one or more tokens.

10. The system of claim 9, wherein the dynamic token generator is further configured to dynamically determine which portion of the attribute data to store in a next-in-time communicated token based at least on the resource event parameters in responses to a last-in-time token received from the one or more of the plurality of virtual computing environment-based resource providers.

11. The system of claim 7, wherein the dynamic token generator is further configured to determine a sequence for communicating, individually and incrementally, each of the one or more tokens to the plurality of virtual computing environment-based resource providers, wherein the determination of the sequence is based, at least, on the portion of the attribute data stored in each of the one or more tokens.

12. The system of claim 7, wherein the decision matrix is further configured to select, from amongst one or more virtual computing environment-based resource providers determined to be candidates, the virtual computing environment-based resource provider for conducting the resource event.

13. The system of claim 12, wherein the decision matrix includes one or more machine learning (ML) models configured to assist in the selection of the virtual computing environment-based resource provider for conducting the resource event.

14. The system of claim 12, wherein the decision matrix includes one or more machine learning (ML) models configured to provide selection details that indicate how and why the virtual computing environment-based resource provider was selected for conducting the resource event.

15. The system of claim 12, the resource event facilitation and decisioning engine further comprises a smart contractor configured to generate a smart contract based at least on the resource event parameters of the selected virtual computing environment-based resource provider and the one or more resource event rules associated with the resource event.

16. The system of claim 15, wherein the smart contractor is further configured to validate the smart contract, wherein validating the smart contract includes at least one of verifying that the smart contract (i) complies to the one or more resource event rules, (ii) does not include non-enforceable clauses, and (iii) does not include additional rules in addition to the one or more resource event rules.

17. A computer program product including a non-transitory computer-readable medium, the non-transitory computer-readable medium comprising:

a first set of codes for causing an edge gateway computing device to receive (i) a resource event request that defines a resource event to be conducted in a virtual computing environment between a user and a virtual computing environment-based resource provider, (ii) one or more resource event rules associated with the resource event and defined by the user, and (iii) attribute data associated with the user including resource-related attribute data;

a second set of codes for causing the edge gateway apparatus to generate one or more tokens, each of the one or more tokens identifying the resource event and storing a different portion of the attribute data;

a third set of codes for causing the edge gateway apparatus to communicate, individually and incrementally, each of the one or more tokens to a plurality of virtual computing environment-based resource providers, wherein the one or more tokens are communicated via one or more edge nodes, each edge node associated with a virtual computing environment in which at least one of a plurality of virtual computing environment-based resource providers is virtually located;

a fourth set of codes for causing the edge gateway apparatus to, for each individual and incremental communication of a corresponding token from amongst the one or more tokens and in response to receiving a response to the corresponding token from one or more of the plurality of virtual computing environment-based resource providers, that defines resource event parameters, determine, at the edge gateway, whether the one or more of the plurality of virtual computing environment-based resource providers are candidates for conducting the resource event with the user, wherein the determination is based, at least, adherence of the resource event parameters to the one or more resource event rules;

a fifth set of codes for causing the edge gateway apparatus, in response to determining that at least one of the one or more responding virtual computing environment-based resource providers is a candidate, to refrain from communicating any additional tokens that store additional portions of the attribute data to the candidate virtual computing environment-based resource provider; and a sixth set of codes for causing the edge gateway apparatus, only in response to determining that none of the one or more responding virtual computing environment-based resource providers are candidates, to communicate a next-in-time token from among the plurality of tokens, the next-in-time token storing an additional portion of the attribute data not stored in the previously communicated token, to at least one of the plurality of virtual computing environment-based resource providers.

18. The computer program product of claim 17, wherein the computer-readable medium further comprises:

a seventh set of codes for causing the edge gateway apparatus to determine (i) a communication mechanism for communicating with each of the one or more edge nodes, and (ii) a token type associated with each of the one or more edge nodes, wherein the one or more tokens are generated in the determined token type.

19. The computer program product of claim 17, further comprising:

a seventh set of codes for causing the edge gateway apparatus to select, from amongst one or more virtual computing environment-based resource providers determined to be candidates, the virtual computing environment-based resource provider for conducting the resource event.

20. The computer-implemented method of claim 19, further comprising:

an eighth set of codes for causing the edge gateway apparatus to implement one or more machine learning (ML) models configured to provide selection details that indicate how and why the virtual computing environment-based resource provider was selected for conducting the resource event.

* * * * *